United States Patent Office 2,876,647
Patented Mar. 10, 1959

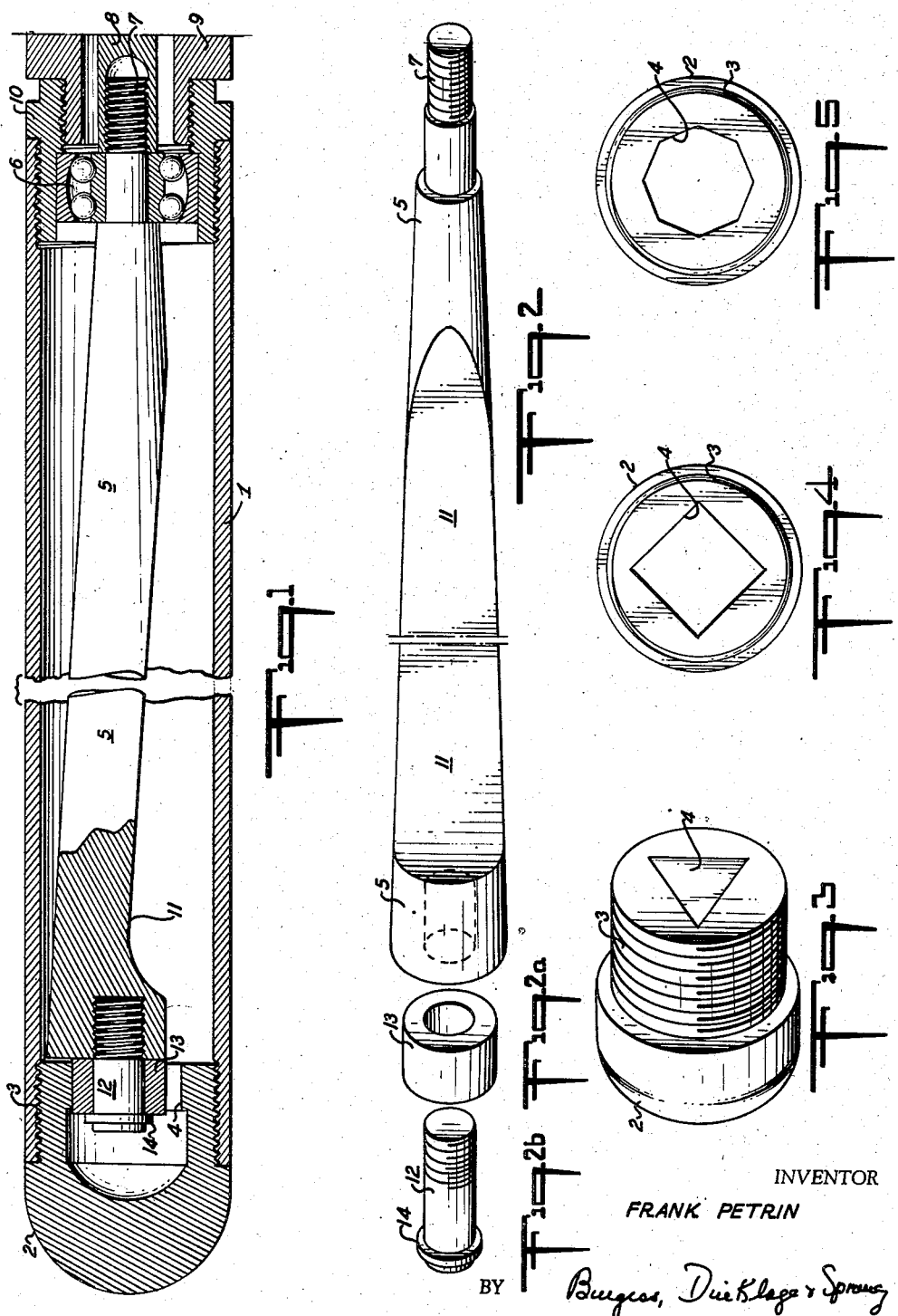

2,876,647
VIBRATOR
Frank Petrin, Elmhurst, N. Y.
Application March 18, 1957, Serial No. 646,863
12 Claims. (Cl. 74—87)

This invention relates to a novel vibrator, and more particularly to a vibrator which may be immersed in a flowable material, as, for example, concrete.

In the building trades after the pouring of concrete and prior to the setting thereof, the flowable, poured concrete mass is often subjected to vibrations in order to remove the occluded air or other gas cells and pockets, and to homogenize and densify the concrete. For this purpose vibrators may be used, which are directly immersed in still wet concrete. Such vibrators may, for example, consist of an elongated cylindrical tube or casing, in which a shaft is rotatably mounted at one end. In addition to the rotary mounting of the shaft, the same may also effect a swinging or pendulum-like motion. The shaft is rotated in the casing by means of a flexible drive shaft driven, for example, by gasoline or electric motor. As the shaft rotates, the centrifugal force causes the free end thereof to swing outwardly in contact with the casing wall or an inner cylindrical wall of a hardened steel end-cap provided for the casing. As the vibrator shaft is so rotated with its free end portion being swung in frictional contact with the inner wall of the casing or end-cap, vibrations are set up in the casing which are transmitted to the concrete or other material in contact with the casing. A vibrator of this type is often referred to as a roll-gear-type vibrator.

As the vibrations in this type of vibrator are dependent upon the frictional contact between the free end of the rotating vibrator shaft and the inner wall of the casing or end-cap, the device must run absolutely dry. Any lubrication between the end portion of the vibrator shaft and the casing or end-cap wall in which it rotates in contact will cause slippage, thus preventing the friction from which the vibration directly results. Very often in operation grease, oil, or other lubricating material will accidentally enter the interior of the casing or leak into the interior of the casing from the drive shaft, thus interfering with operation. When this occurs, the vibrator head must be taken out of operation, disassembled, and the lubrication completely removed from the interior.

Since the vibration depends upon the frictional contact the free end portion of the vibrator shaft and the inner wall of the casing or casing end-cap in connection with which the vibrator shaft moves in frictional contact is subjected to excessive wear and must be often replaced.

Since the friction between the end portion and the corresponding inner wall of the casing or casing end-cap depends upon a number of variables and varies under different operating conditions, it is not possible, during operation to insure that the vibrations desired will reliably occur, and will occur at the desired frequency and amplitude.

One object of this invention is a vibrator which overcomes the above mentioned disadvantages.

This, and still further objects, will become apparent from the following description read in conjunction with the drawing, in which:

Fig. 1 is a vertical section of an embodiment of a vibrator in accordance with the invention; Fig. 2 is a perspective view of the shaft of the vibrator shown in Fig. 1;

Figs. 2a and 2b are perspective views of the roller and stud, respectively, of the vibrator shaft of Fig. 1 shown in exploded position;

Fig. 3 is a perspective view of an embodiment of the end cap of the vibrator shown in Fig. 1;

Fig. 4 is a plan view of a further embodiment of an end cap for the vibrator in accordance with the invention; and Fig. 5 is a plan view of a still further embodiment of an end cap for the vibrator in accordance with the invention.

The vibrator in accordance with the invention has a vibrator shaft and preferably an eccentrically weighted vibrator shaft mounted at one end portion for rotary and limited swinging motion and means defining a polygonal aperture, as, for example, an aperture having from 3–8 sides with rigid walls positioned with the other, i. e., the free end of the vibrator shaft extending in the aperture.

The end of the shaft extending into the aperture is preferably defined by a stud having a roller mounted thereon for engagement with the walls of the aperture. The vibrator shaft is preferably mounted in an elongated hollow casing, such as a cylindrical casing, with the aperture being defined by an end cap for the casing. The vibrator shaft is preferably mounted in the casing by means of a swing-type ball bearing and is preferably so constructed that it may be connected to a flexible shaft for rotation.

Referring to the embodiment shown in the drawing, as shown in Fig. 1, the vibrator has a cylindrical hollow casing 1, for example, constructed of steel. One end of the casing is closed by an end cap 2 which is screwed to the casing by means of the threads 3. The end cap 2 has a polygonal aperture 4 with rigid walls as, for example, of hardened steel. The polygonal aperture may have any number of side walls ranging from 3 on upward, though a 3–8-sided polygonal aperture is preferred. As shown, Fig. 3 shows an embodiment with a triangular aperture, Fig. 4 with a rectangular aperture, and Fig. 5 with an octagonal aperture.

An eccentrically weighted shaft 5 is rotatably mounted in the casing 1 by means of the tilt or swing roller bearing 6. The bearing 6 in addition to allowing rotary motion, will allow a limited swinging or pendulum-like motion.

The end of the vibrator shaft 5 extending from the interior of the casing past the bearing 6 is provided with a threaded portion 7 to which the correspondingly female threaded connector 8 of the rotating core of a flexible shaft is connected. The bearing 6 is mounted in a sleeve 10, which also has a female threaded portion to which the end 9 of the casing for the flexible drive shaft may be connected, thus providing, if desired, a more or less hermetic seal for the interior of the casing 1 and the interior of the flexible drive shaft casing. In order to provide for the eccentric weighting of the shaft 5, the same has a ground-out portion 11 so that the bulk of its mass, particularly at the free end, is off center. A stud 12 is screwed into a tapped bore at the end of the shaft 5. A roller 13, as, for example, of hardened steel, is rotatably mounted on the stud 12 and held in place by the flange 14 provided on the stud. The stud 12 extends into the aperture 4, so that the roller 13 may make contact with the polygonal side walls of the aperture.

In operation, the shaft 5 is rotated by any desired drive means, as, for example, by means of a small gasoline or electric motor connected to the flexible drive shaft. Any desired rotary speed may be used as, for example, the conventional drive speeds, of, for example, 1800–4800 R. P. M., and preferably within the 3,000 R. P. M. range.

As shaft 5 rotates, the eccentric weighting of the same will induce the centrifugal force produced to maintain the roller 13 in contact with the polygonal aperture 4. As the shaft 5 rotates, the roller 13 therefore moves from one polygonal wall to the next, setting up a positive vibration of high amplitude. The vibration is directly dependent on the number of sides of the polygonal wall and the speed of rotation of the shaft, and thus may be accurately determined. The amplitude of vibration is inversely proportional to the number of sides of the polygonal aperture, so that, at a given R. P. M., as the number of sides of the aperture is increased, the vibration frequency will correspondingly increase, and the amplitude of vibration will correspondingly decrease.

Since the vibration effect is solely dependent upon the roller 13 striking the various sides of the polygonal aperture in sequence and is not dependent on friction or the like, the device may be lubricated, greatly increasing its life, and operation will not be impaired by leakage of lubricant or the like into the interior of the casing.

The roller 13 is not essential for operation and the device operates equally well using the stud 12 alone, and for that matter any projection of the end of the shaft 5, extending in the aperture 4. The roller 13, however, has the advantage of further reducing friction, and thus wear. With the stud 12 being removably screwed into the shaft 5, after a prolonged period of operation the stud 12 may be removed and the roller 13 replaced, thus renewing the device to its original condition at a very small cost. In the same manner, if wear occurs at the walls of the polygonal aperture tending to round the same out after prolonged period of operation, the end cap 2 may be replaced or the polygonal aperture may be defined by an insert which is removably inserted in the end cap 2 and which in itself may be replaced at a lesser cost.

While the eccentrically weighted shaft insures reliable operation under all conditions and a high efficiency, it is apparent that a normal symmetrical shaft will not be perfectly dynamically balanced and will not be operated in a perfectly vertical position, so that the same would be operative within the broader aspects of the applicant's invention.

While a tilt ball-bearing of the type 6 as shown is preferred, it is, of course, obvious that any bearing may be used which will allow rotation in limited pendulum-like swinging of the shaft 5.

In operation, the casing 1 with the connected parts may be lowered, as, for example, by means of the flexible drive shaft into the poured concrete and used in the conventional manner.

While the device is primarily intended for such use in connection with the building trade, it is obvious that the same may be used for any other purpose where a vibrator of this type is desirable.

While the invention has been described with reference to the specific embodiment shown, various changes and modifications will become apparent to the skilled artisan which fall within the spirit of the invention and scope of the appended claims.

I claim:
1. A vibrator comprising a shaft mounted at one end portion for rotary and limited swinging motion and means defining a polygonal aperture with rigid walls positioned with the other end of said shaft extending in said aperture.

2. A vibrator comprising an eccentrically weighted shaft mounted at one end portion for rotary and limited swinging motion and means defining a polygonal aperture with rigid walls positioned with the other end of said eccentrically weighted shaft extending in said aperture.

3. Vibrator according to claim 2, in which the end of said shaft extending into said aperture is defined by a stud having a roller mounted thereon for engagement with the walls of said aperture.

4. A vibrator comprising an elongated hollow casing, an eccentrically weighted shaft extending through the hollow interior of said casing, means mounting one end portion of said shaft for rotational and limited swinging motion at an end portion of said casing, and means defining a polygonal aperture with rigid walls positioned at the other end portion of said casing with the free end of said shaft extending into said aperture.

5. Vibrator according to claim 4, in which the free end of said shaft has a stud axially connected thereto, said stud having a roller mounted thereon for engagement with the walls of said aperture.

6. Vibrator according to claim 5, in which said stud is removably connected to said shaft.

7. Vibrator according to claim 4, in which said means mounting said shaft comprises a swing ball bearing.

8. Vibrator according to claim 4, including means for rotatably connecting a flexible drive shaft to the mounted end of said eccentrically weighted shaft.

9. Vibrator according to claim 4, in which said casing is a cylindrical casing and said means defining said aperture an end-closure for said casing.

10. Vibrator according to claim 9, in which said polygonal aperture has at least 3 sides and not more than 8 sides.

11. A vibrator comprising an elongated hollow cylindrical casing, an eccentrically weighted shaft extending through the hollow interior of said casing, a swing bearing mounting one end portion of said shaft for rotational and limited swinging motion at an end portion of said casing, a screw closure for the other end portion of said casing defining a polygonal aperture with rigid walls, a stud having a roller mounted thereon axially connected to the free end of said shaft and extending into said aperture, and means for connecting a drive shaft to the mounted end of said eccentrically weighted shaft.

12. Vibrator according to claim 11, in which said polygonal aperture has at least 3 sides and not more than 8 sides.

References Cited in the file of this patent

UNITED STATES PATENTS

| | | |
|---|---|---|
| 2,194,410 | Svenson | Mar. 19, 1940 |
| 2,284,090 | Hotchkiss | May 26, 1942 |
| 2,490,122 | Glegg | Dec. 6, 1949 |
| 2,678,195 | Hunter et al. | May 11, 1954 |